US008643616B1

(12) United States Patent
Zhang et al.

(10) Patent No.: US 8,643,616 B1
(45) Date of Patent: Feb. 4, 2014

(54) CURSOR POSITIONING ON A TOUCH-SENSITIVE DISPLAY SCREEN

(75) Inventors: Mingjun Zhang, Beijing (CN); Mao Liang, Beijing (CN)

(73) Assignee: Adobe Systems Incorporated, San Jose, CA (US)

( * ) Notice: Subject to any disclaimer, the term of this patent is extended or adjusted under 35 U.S.C. 154(b) by 391 days.

(21) Appl. No.: 13/194,140

(22) Filed: Jul. 29, 2011

(51) Int. Cl.
*G06F 3/041* (2006.01)

(52) U.S. Cl.
USPC .......................................... 345/173

(58) Field of Classification Search
USPC .................. 345/156, 157, 173–177; 715/711, 715/856–859
See application file for complete search history.

(56) References Cited

U.S. PATENT DOCUMENTS

| 5,621,438 | A  | * | 4/1997  | Kamimura et al. ........... 345/178 |
| 6,278,443 | B1 |   | 8/2001  | Amro et al. |
| 6,727,892 | B1 | * | 4/2004  | Murphy ........................ 345/173 |
| 7,605,804 | B2 |   | 10/2009 | Wilson |
| 7,640,518 | B2 | * | 12/2009 | Forlines et al. ............... 715/863 |
| 7,856,605 | B2 |   | 12/2010 | Ording et al. |
| 2006/0026521 | A1 | * | 2/2006  | Hotelling et al. ............. 715/702 |
| 2007/0247435 | A1 | * | 10/2007 | Benko et al. .................. 345/173 |
| 2008/0180402 | A1 |   | 7/2008  | Yoo et al. |
| 2013/0002600 | A1 | * | 1/2013  | McCracken ................... 345/174 |
| 2013/0201106 | A1 | * | 8/2013  | Naccache ...................... 345/158 |

OTHER PUBLICATIONS

Gohring, Nancy, "Microsoft Research project tackles mobile touch-screen problems", http://www.computerworld.com/s/article/9019686/Microsoft_Research_project_tackles_mobile_touch_screen_problems, (May 16, 2007), 5 pgs.

Vogel, Daniel, et al., "Shift: A Technique for Operating Pen-Based Interfaces Using Touch", CHI '07: Proceedings of the SIGCHI Conference on Human Factors in Computing Systems, (2007), 657-666.

* cited by examiner

*Primary Examiner* — Rodney Amadiz
(74) *Attorney, Agent, or Firm* — Schwegman Lundberg & Woessner, P.A.

(57) ABSTRACT

In one embodiment, a method for positioning a cursor displayed on a touch-sensitive display screen is provided. The method may comprise detecting a body member touching the touch-sensitive display screen and identifying an offset between the body member and the cursor. Movement of the body member relative to the touch-sensitive display screen can also be detected. Upon detection of the movement, the cursor is also moved from the offset to match the movement of the body member. The body member may then be released and repositioned to a different position on the touch-sensitive display screen. Upon detection of the repositioning, a different offset between the body member at the different position and the cursor is identified. Additional movement of the body member after the detection of the reposition is detected and thereafter, the cursor is moved from the different offset to match the additional movement of the body member.

18 Claims, 12 Drawing Sheets

CURSOR POSITIONING ON A TOUCH-SENSITIVE DISPLAY SCREEN

FIELD

The present disclosure relates generally to graphical user interfaces. In one example embodiment, the disclosure relates to cursor positioning on a touch-sensitive display screen.

BACKGROUND

A touch-sensitive display screen is a video display that can detect the presence and location of a touch within the display area. With a touch-sensitive display screen, a user can use a variety of touch gestures to interact directly with graphical objects that are displayed, rather than indirectly with a pointing device, such as a mouse or a touchpad. For example, a user can use simple finger gestures to select text displayed on a touch-sensitive display screen to be cut, copied, or highlighted.

However, a user may have difficulties selecting objects smaller than a finger because such objects are difficult to target with a finger. Targeting such small objects can be difficult because of an ambiguous selection point created by a finger's contact area in combination with the finger completely or partially blocking the target object. Accordingly, such displays with small objects make selection with a finger slow and error-prone.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Embodiments described herein provide a cursor positioning technique on a touch-sensitive display screen. In general, a user can use a body member (e.g., a finger) touching the touch-sensitive display screen to control movement of a cursor that is displayed on the same touch-sensitive display screen. As explained in detail below, the user can effectively control the cursor from a distance with his body member, and this distance can be arbitrarily set by the user.

Figure 1A:
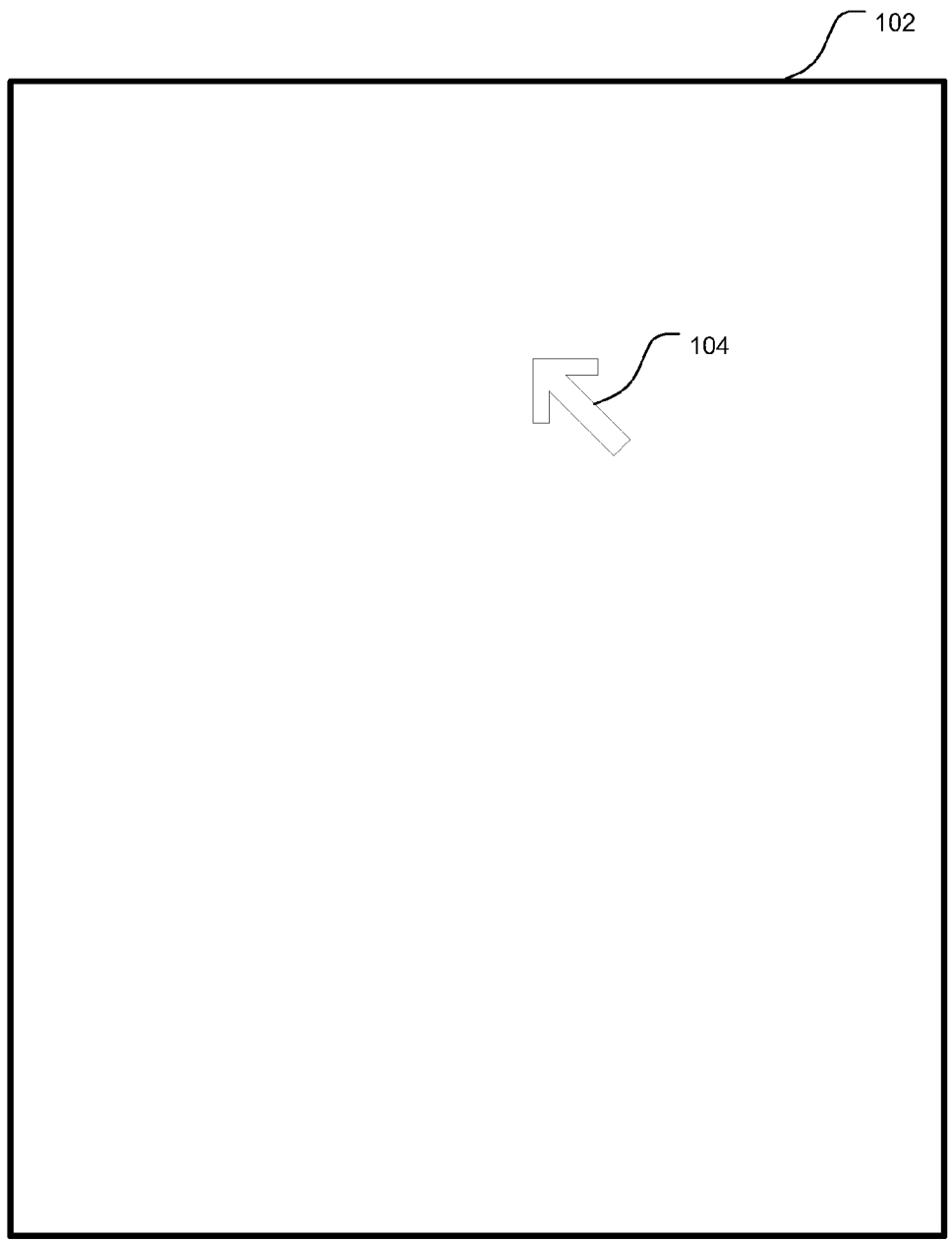
FIGS. 1A-1F are graphical user interface (GUI) diagrams illustrating the positioning of a cursor displayed on a touch-sensitive display screen based on an offset from a finger, in accordance with example embodiments.

FIGS. 1A-1F are graphical user interface (GUI) diagrams illustrating the positioning of a cursor displayed on a touch-sensitive display screen based on an offset from a finger, in accordance with example embodiments. As depicted in FIG. 1A, a touch-sensitive display screen 102 displays a cursor 104, which is an indicator or pointer that shows a position on the touch-sensitive display screen 102 or other video display. The cursor 104 can be represented in a variety of different shapes, such as an arrow (as depicted FIG. 1A), a cross, a triangle, and other shapes.

Figure 1B:
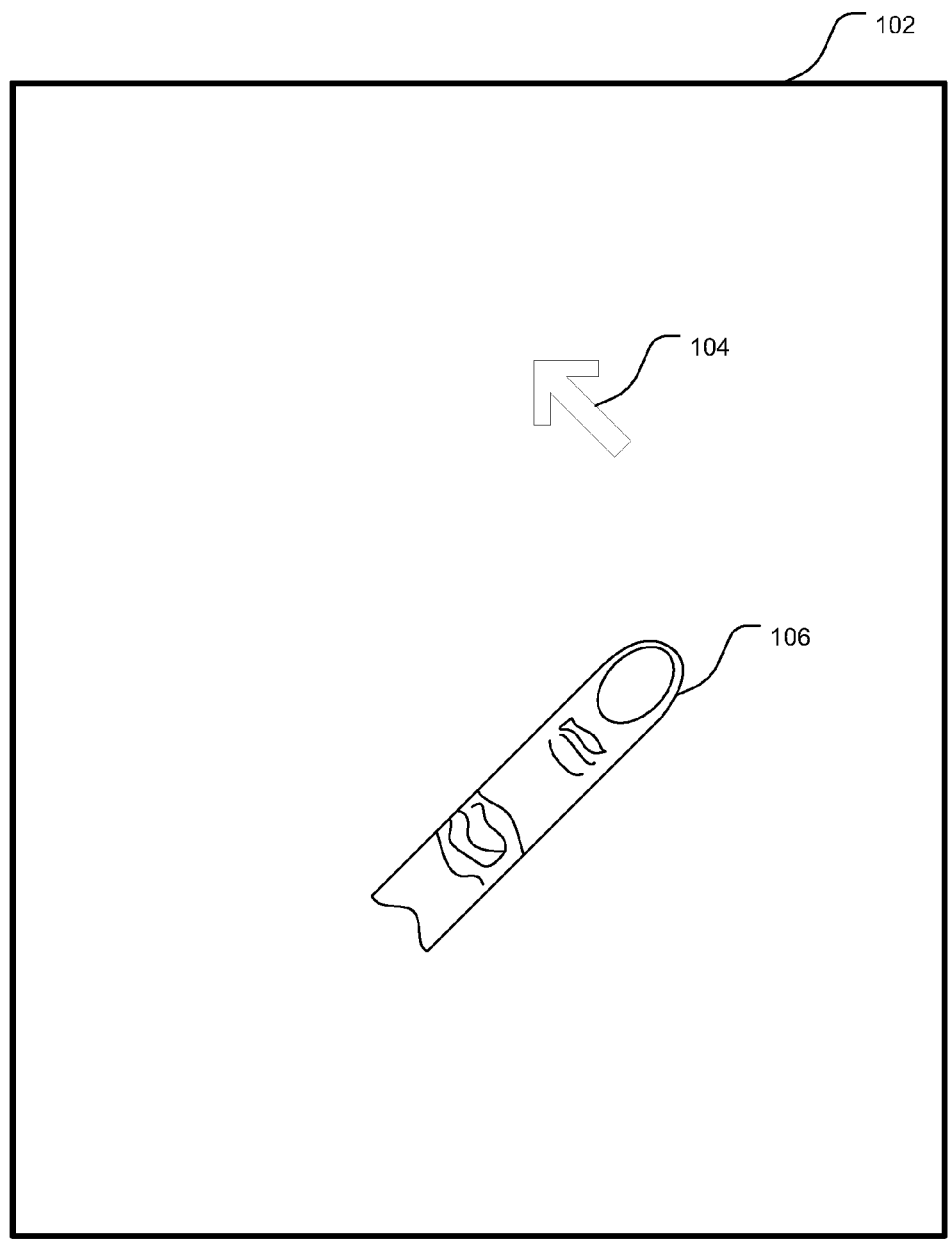
Figure 1C:
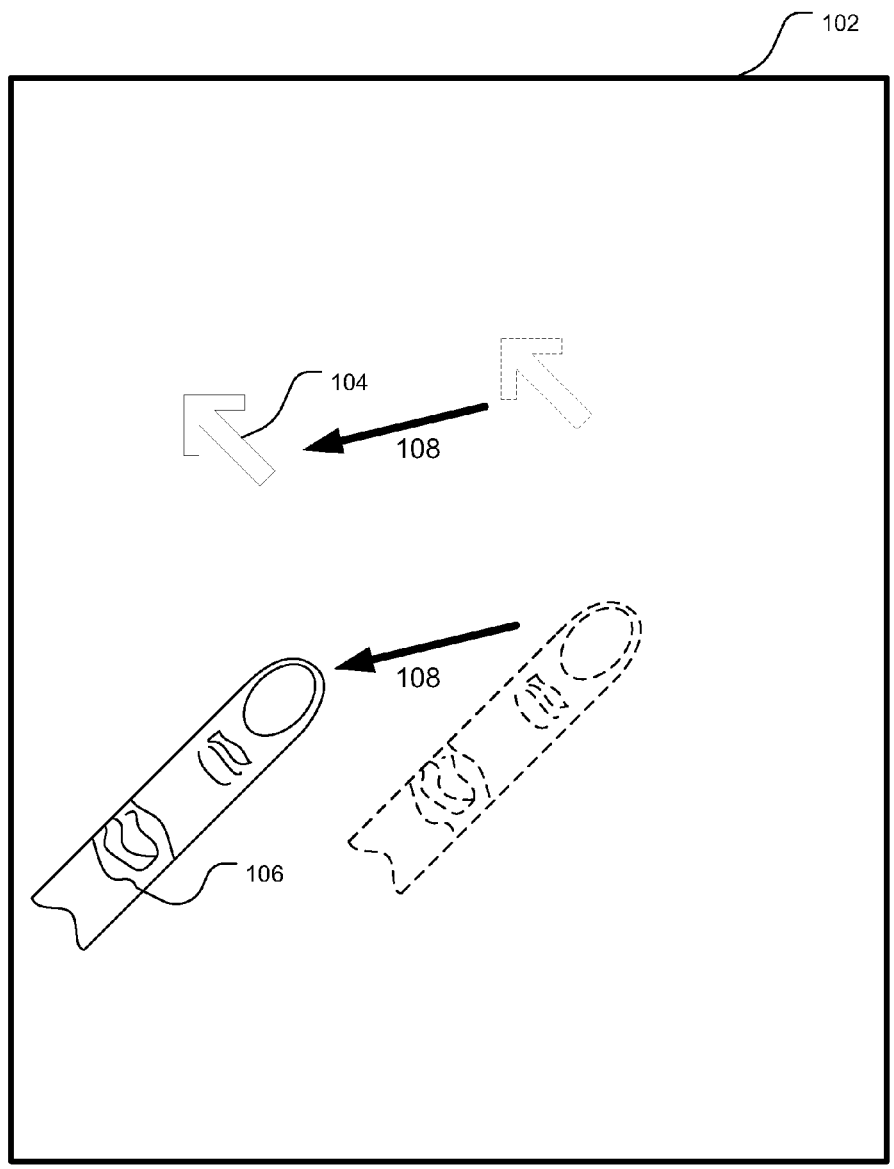

As depicted in FIG. 1B, a finger 106 touches the touch-sensitive display screen 102 at a different location from the cursor 104 such that the cursor 104 is at an offset from the finger 106. As used herein, an "offset" refers to a point, curve, or surface associated with the cursor 104 lying at a fixed distance from a position of a body member, such as the finger 106. When the finger 106 moves along a surface of the touch-sensitive display screen 102, the cursor 104 also moves with the finger 106, but from an offset distance. For example, as depicted in FIG. 1C, when the finger 106 moves from left to right, the direction of which is indicated by arrow 108, the cursor 104 also moves from left to right.

Figure 1D:
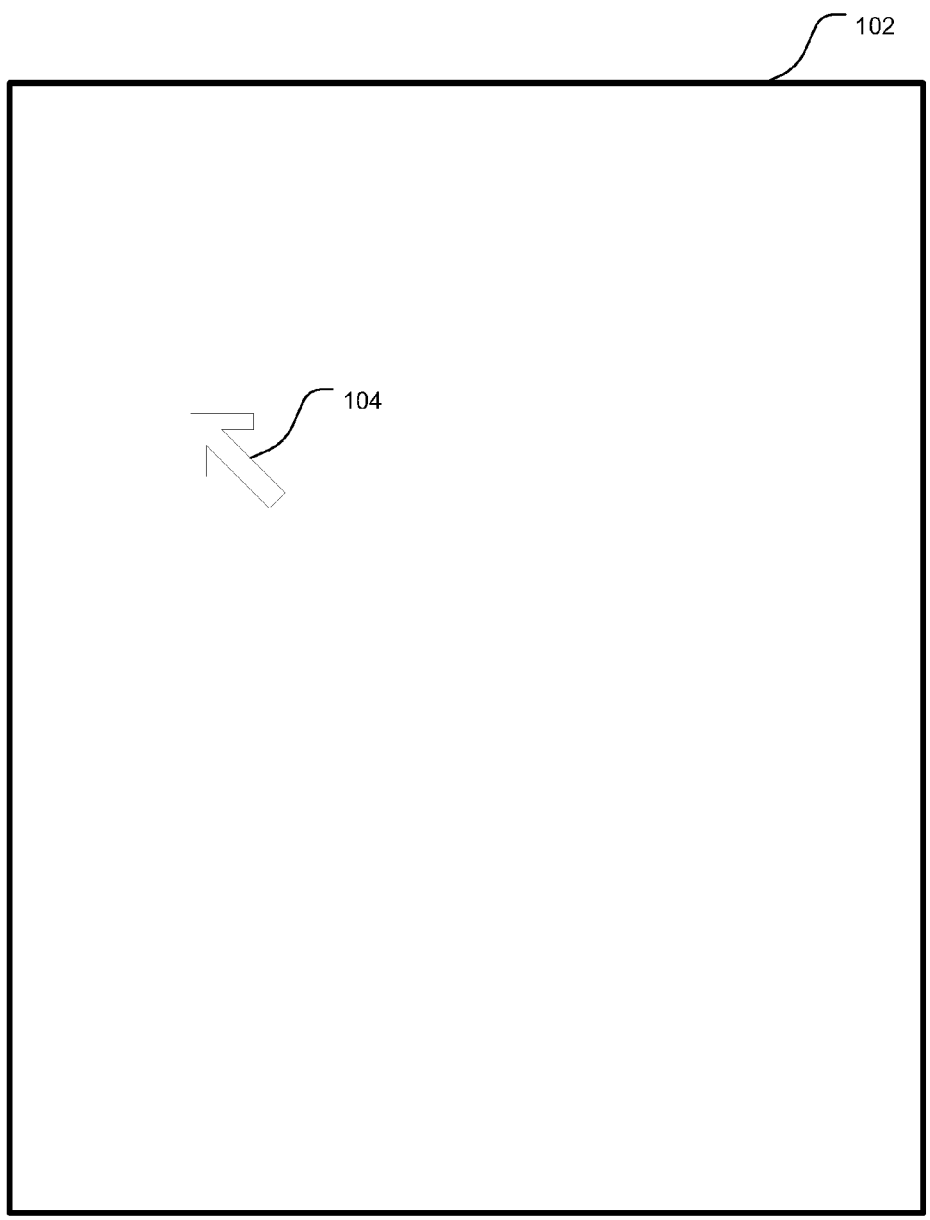
Figure 1E:
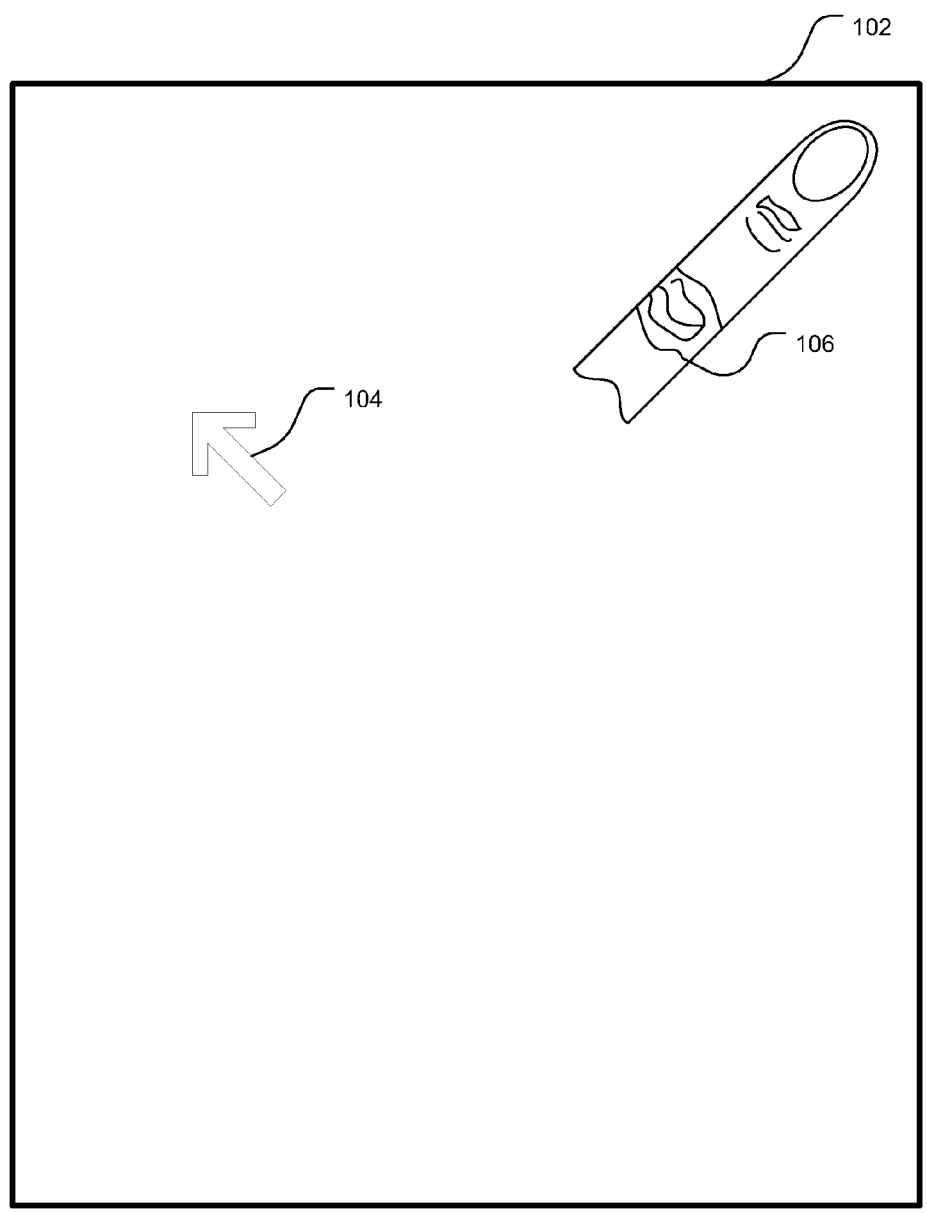

Example embodiments described herein allow the finger 106 to define the offset. That is, the positioning of the finger 106 automatically defines the offset from the finger 106 to the cursor 104, and this finger 106 can be placed in any suitable location on the touch-sensitive display screen 102. As illustrated in FIG. 1D, the finger (not shown) is picked up such that the finger does not touch the touch-sensitive display screen 102. Thereafter, as illustrated in FIG. 1E, the finger 106 is repositioned to a different position on the touch-sensitive display screen 102. In this example, the cursor 104 remains stationary when the finger 106 is picked up and repositioned. The placement of the finger 106 at a different location automatically defines a new offset from the finger 106 to the cursor 104.

Figure 1F:
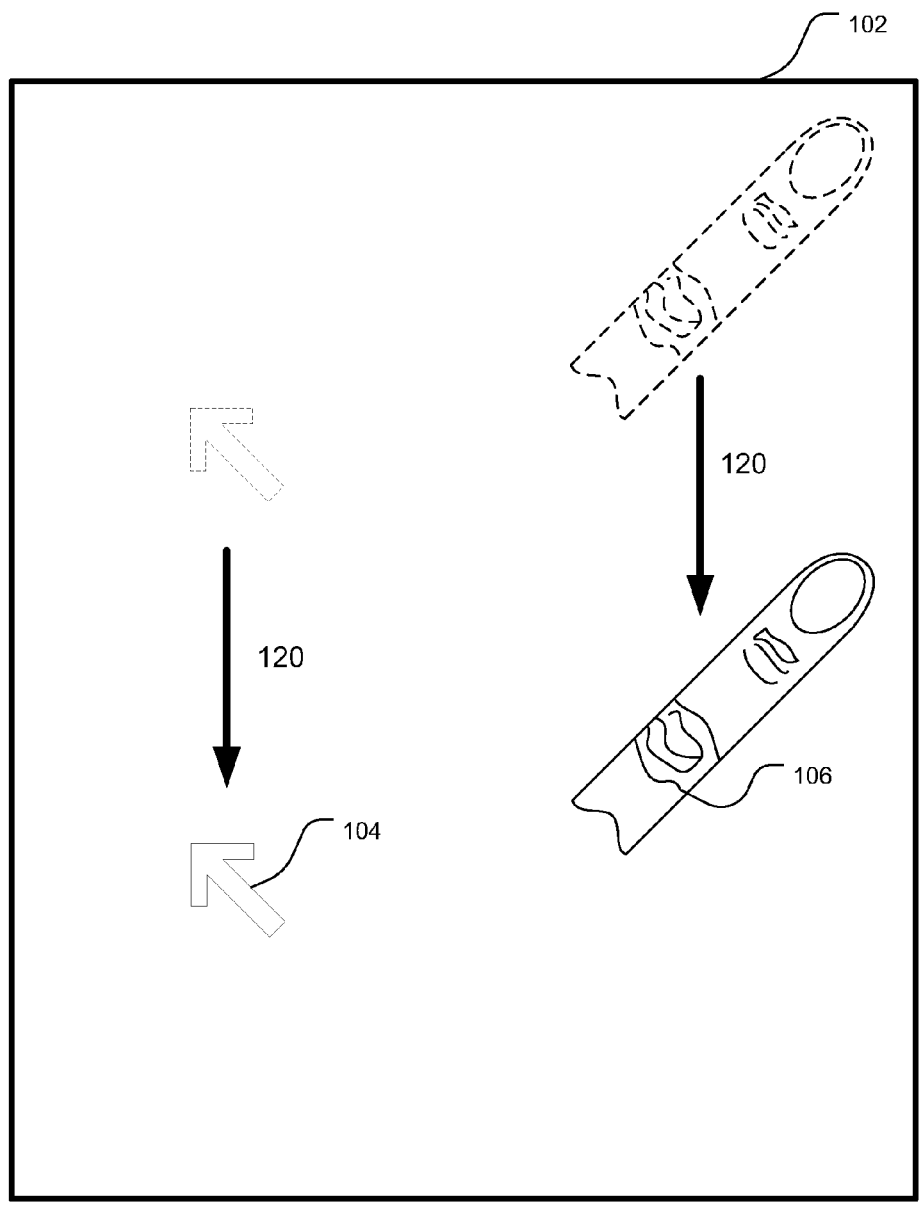

The finger 106 can again move relative to the touch-sensitive display screen 102, and this movement also causes the cursor 104 to move with the finger 106 from the offset. For example, as depicted in FIG. 1F, the finger 106 moves from top to bottom of the touch-sensitive display screen 102, the direction of which is indicated by arrow 120, and as a result of the movement of the finger 106, the cursor 104 also moves from top to bottom from the offset.

Figure 2:
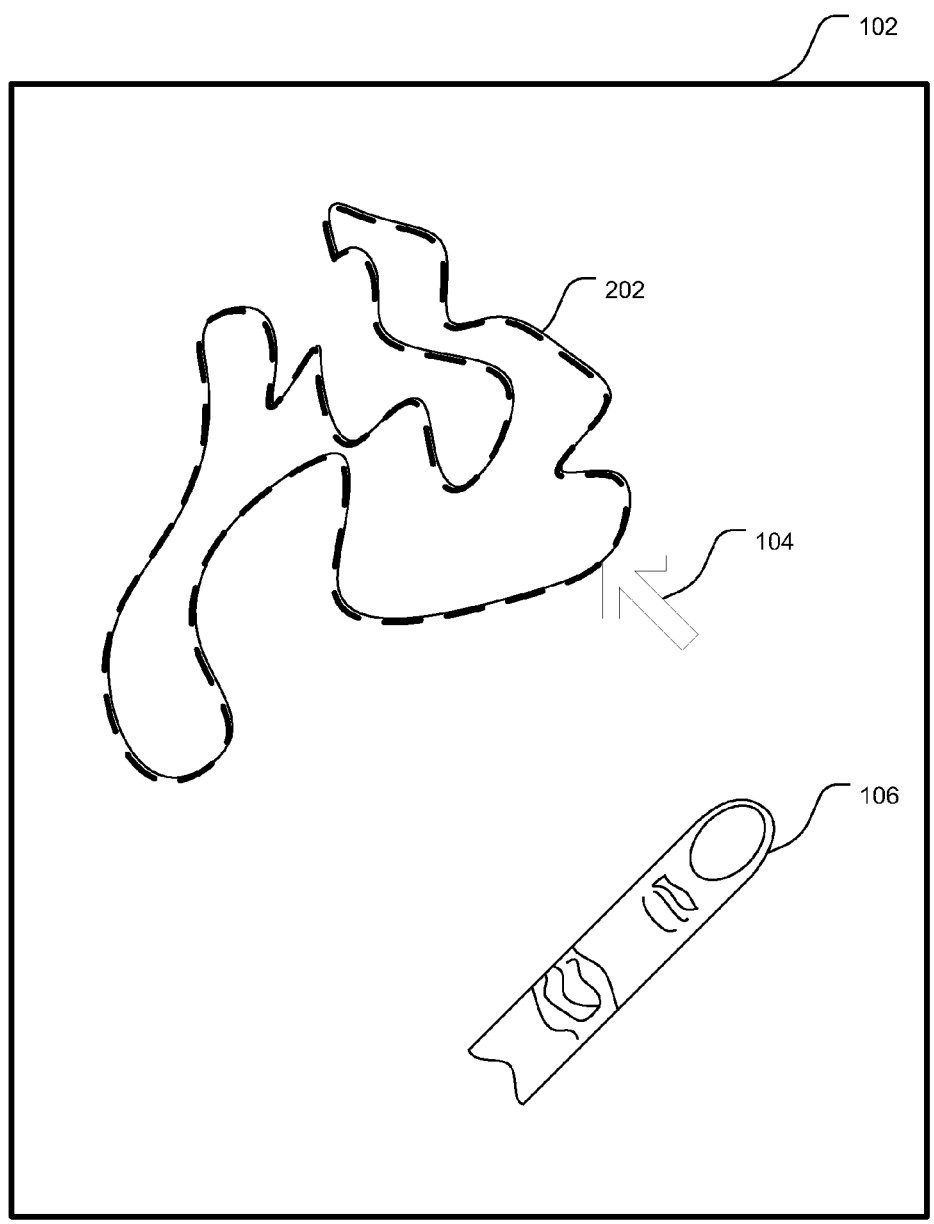
FIG. 2 is a GUI diagram illustrating the use of a cursor to trace a detailed object using an embodiment of the cursor positioning technique described in FIGS. 1A-1F.

Controlling movement of the cursor 104 from an offset therefore results in a technique to position the cursor 104 where the finger 106 does not block a user's view of the cursor 104. As a result, the cursor 104 can be positioned with much greater precision than compared to, for example, the conventional technique of directly targeting an object with the finger 106. For example, FIG. 2 is a GUI diagram illustrating the use of a cursor 104 to trace a detailed object 202 using an embodiment of the cursor-positioning technique described in FIGS. 1A-1F. Here, the touch-sensitive display screen 102 displays an object 202 having an intricate shape. Using the positioning technique described herein, a user can use his finger 106 to precisely position the cursor 104 from an offset. From this offset, the finger 106 does not block the user's view of any portion of the cursor 104, and as a result, the user can use his finger 106 to accurately target and trace the outline of the intricate shape of the object 202.

Figure 3:
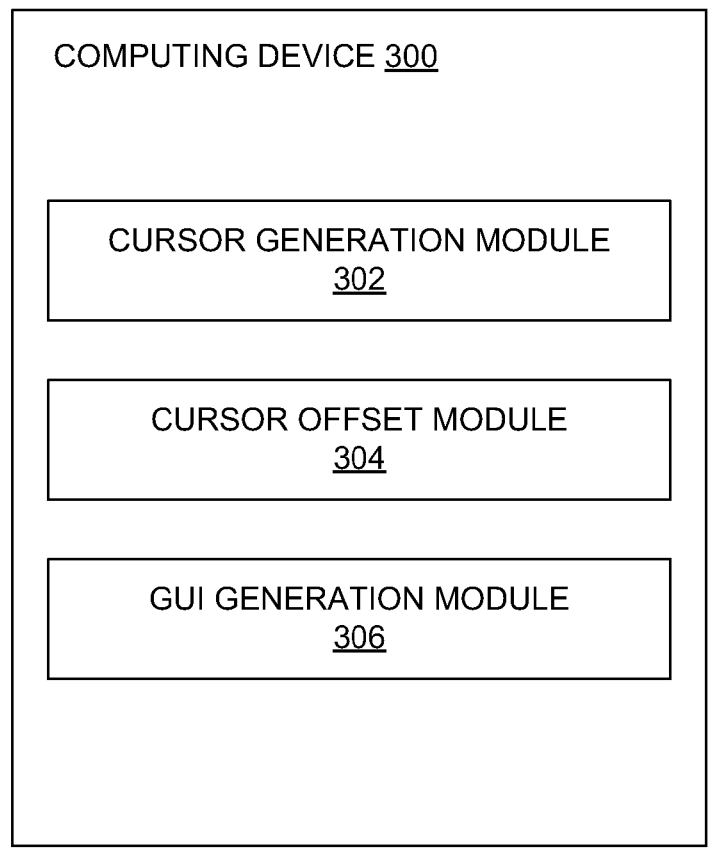
FIG. 3 is a block diagram of various modules embodied in a computing device, in accordance with one example embodiment, for enabling the embodiments of the cursor positioning techniques as described in FIGS. 1A-1F.

FIG. 3 is a block diagram of various modules 302, 304, and 306 embodied in a computing device 300, in accordance with one example embodiment, for enabling the embodiments of the cursor-positioning techniques as described in FIGS. 1A-1F. It should be appreciated that the computing device 300 may be deployed in the form of, for example, a personal computer, a laptop computer, a server computer, a tablet personal computer, a smart phone, a personal digital assistant, or other computing devices. In various embodiments, the computing device 300 may be used to implement computer programs, logic, applications, methods, processes, or software to position cursors on a touch-sensitive display screen, as described in more detail below.

As depicted in FIG. 3, the computing device 300 includes a cursor generation module 302, a cursor offset module 304, and a GUI generation module 306. In general, the cursor generation module 302 is configured provide a rendering of a cursor and its movement on a touch-sensitive display screen. In addition, the cursor generation module 302 can detect various events related to cursor positioning, such as detecting a body member touching a touch-sensitive display screen and detecting movement of the body member relative to the touch-sensitive display screen.

The cursor offset module 304 is configured to identify an offset between a body member and a cursor. As explained in detail below, such an offset can be identified based on the different positions of the body member and the cursor.

The GUI generation module 306 is configured to generate GUI objects on a touch-sensitive display screen. In one embodiment, instead of the cursor generation module 302 generating and rendering the cursor, the GUI generation module 306 can also generate a rendering of the cursor.

It should be appreciated that in other embodiments, the computing device 300 may include fewer or more modules apart from those shown in FIG. 3. For example, in an alternate embodiment, the GUI generation module 306 can be omitted. The modules 302, 304, and 306 may be in the form of software that is processed by a processor. In another example, as explained in more detail below, the modules 302, 304, and 306 may be in the form of firmware that is processed by application-specific integrated circuits (ASIC), which may be integrated into a circuit board. Alternatively, the modules 302, 304, and 306 may be in the form of one or more logic blocks included in a programmable logic device (for example, a field programmable gate array). The described modules 302, 304, and 306 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
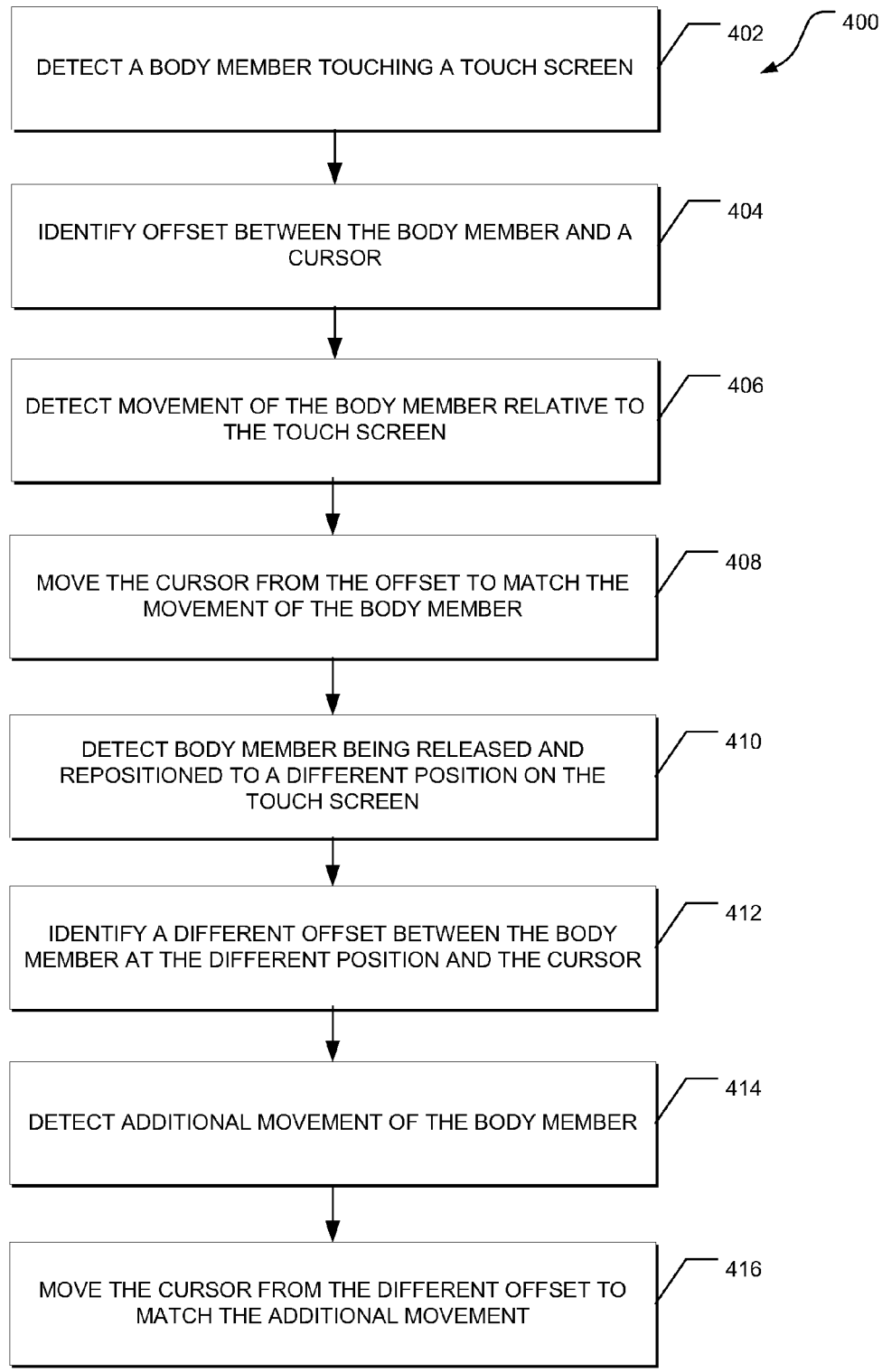
FIG. 4 is a flow diagram of a general overview of a method, in accordance with an example embodiment, for cursor positioning on a touch-sensitive display screen.

FIG. 4 is a flow diagram of a general overview of a method 400, in accordance with an example embodiment, for cursor positioning on a touch-sensitive display screen. In an example embodiment, the method 400 may be implemented by the cursor generation module 302 and the cursor offset module 304 as embodied in the computing device 300 depicted in FIG. 3. As depicted at 402 of FIG. 4, a body member touching a touch-sensitive display screen is detected. A cursor is also displayed on the touch-sensitive display screen. Upon the detection of the touch, an offset between the body member touching the touch-sensitive display screen and the cursor is identified at 404.

Thereafter, movement of the body member relative to the touch-sensitive display screen is detected at 406 and, as a result, the cursor is also moved, from the offset, to match the movement of the body member. After the movement, the body member may be detected at 410 to be released (or picked up from the touch-sensitive display screen) and repositioned to a different position on the touch-sensitive display screen. Upon the repositioning, a different offset between the body member and the cursor is identified at 412. Afterwards, additional movement of the body member is again detected at 414 and in response, the cursor is again moved, from this new offset, to match the movement of the body member.

Figure 5:
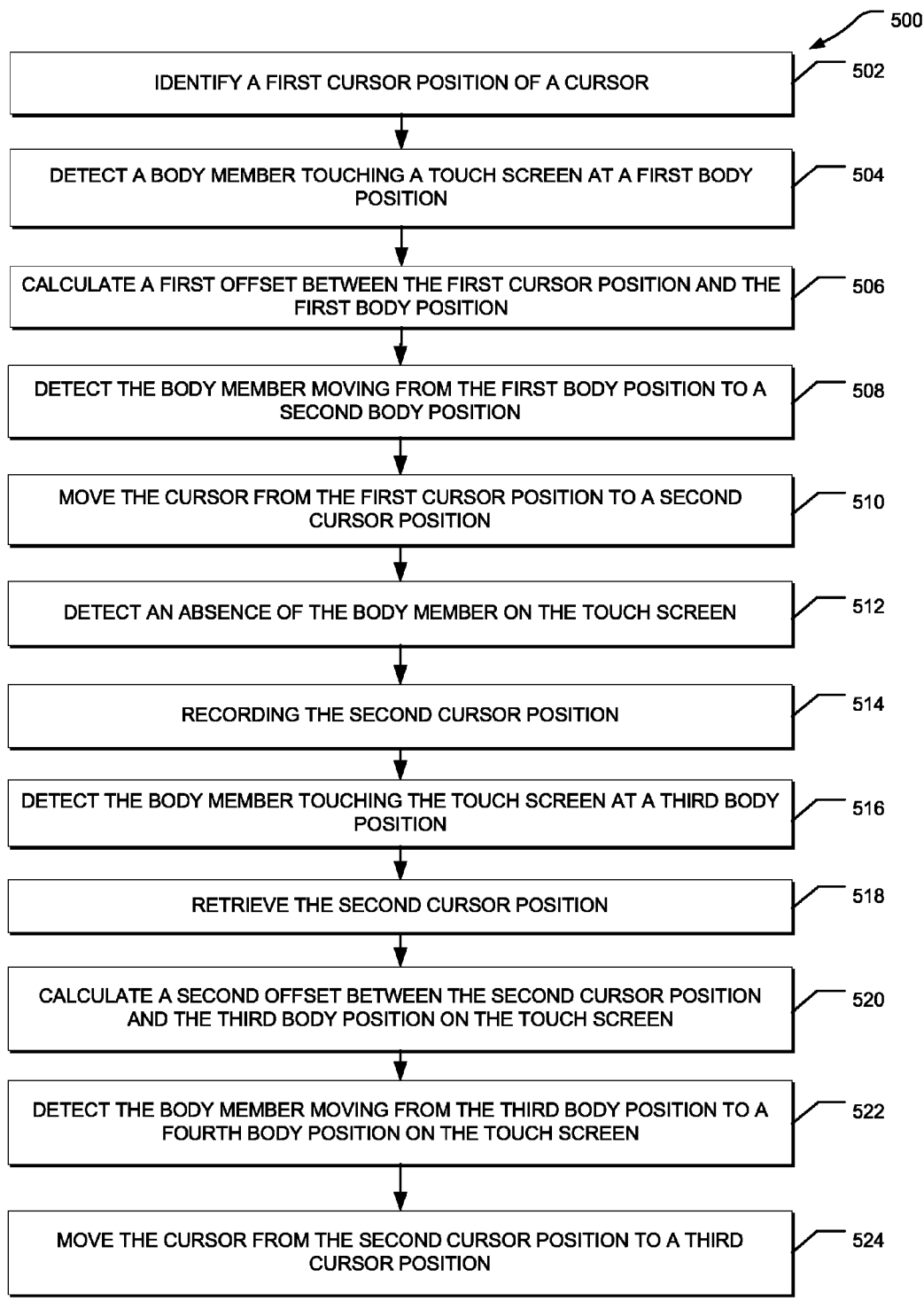
FIG. 5 is a flow diagram of a detailed method, in accordance with an example embodiment, that further details the cursor positioning methodology generally described in FIG. 4.

FIG. 5 is a flow diagram of a detailed method 500, in accordance with an example embodiment, that further details the cursor positioning methodology generally described in FIG. 4. In an example embodiment, the method 500 may be implemented by the cursor generation module 302 and the cursor offset module 304 as embodied in the computing device 300 depicted in FIG. 3. In reference to FIG. 5, a position of the cursor (or a "first cursor position") displayed on the touch-sensitive display screen is identified at 502. In one example, this first cursor position can be provided by the cursor generation module 302, which is configured to track the position of the cursor. Additionally, at 504, a body member touching the touch-sensitive display screen at another position (or a "first body position") is detected. In one example, detection may be made by receiving an event from, for example, the operating system. This received event provides an indication or notification that the body member is touching the touch-sensitive display screen at the first body location. Examples of such events generated by the operating system include a touch event and a touch down event.

Thereafter, at 506, an offset (or "first offset") is calculated between the first cursor position and the first body position. For example, positions can be defined on the touch-sensitive display screen by using horizontal and vertical coordinates. The first offset can be calculated by taking the difference between the horizontal and vertical coordinates of the first cursor position and the first body position. The following equations define an example of a first offset:

$$\text{First Offset } x \text{ coordinate} = \alpha(\text{First Body } x \text{ coordinate} - \text{First Cursor } x \text{ coordinate})$$

$$\text{First Offset } y \text{ coordinate} = \alpha(\text{First Body } y \text{ coordinate} - \text{First Cursor } y \text{ coordinate})$$

Where the "x" refers to a horizontal direction, the "y" refers to a vertical direction, and the "$\alpha$" is a speed coefficient defining the speed of the cursor.

At 508, the body member is detected to move from the first body position to a different position on the touch-sensitive display screen (or "second body position"). In one example, movement can be detected by receiving an event from, for example, the operating system indicating movement of the body member. Examples of such events generated by the operating system include motion event and touch move event.

Upon detection of the movement of the body member, the cursor is also moved at 510 from the first cursor position to a different position on the touch-sensitive display screen (or "second cursor position"). The movement of the cursor matches the movement of the body member, but this movement is made from the calculated first offset.

After the movement of the body member, an absence of the body member on the touch-sensitive display screen is detected at 512. For example, a user may pick up his finger from the touch-sensitive display screen or, in other words, the user may release his touch. Such an action can be detected by, for example, receiving an event from an operating system indicating the release of the body member. Examples of such events generated by the operating system include action up event and touch up event. After the release, the second cursor position is recorded at 514. That is, the position of the cursor at its last location before the release is recorded. For example, the horizontal and vertical coordinates associated with the second cursor position can be stored in memory.

Afterwards, the user may reposition his body member to touch a different location on the touch-sensitive display screen. Here, at 516, the body member is detected to touch the touch-sensitive display screen at another position (or "third body position"). The second cursor position is retrieved from memory at 518 and another offset (or "second offset") is then calculated between the second cursor position and this third body position. The user may again move his body member, and this movement from the third body position to yet another different position (or "fourth body position") is detected at 522. Upon detection of the movement, the cursor is also moved from the second cursor position to yet another position on the touch-sensitive display screen (or "third cursor position"). Again, this movement of the cursor matches the movement of the body member to the fourth body position, and this movement is made from the calculated second offset.

Figure 6:
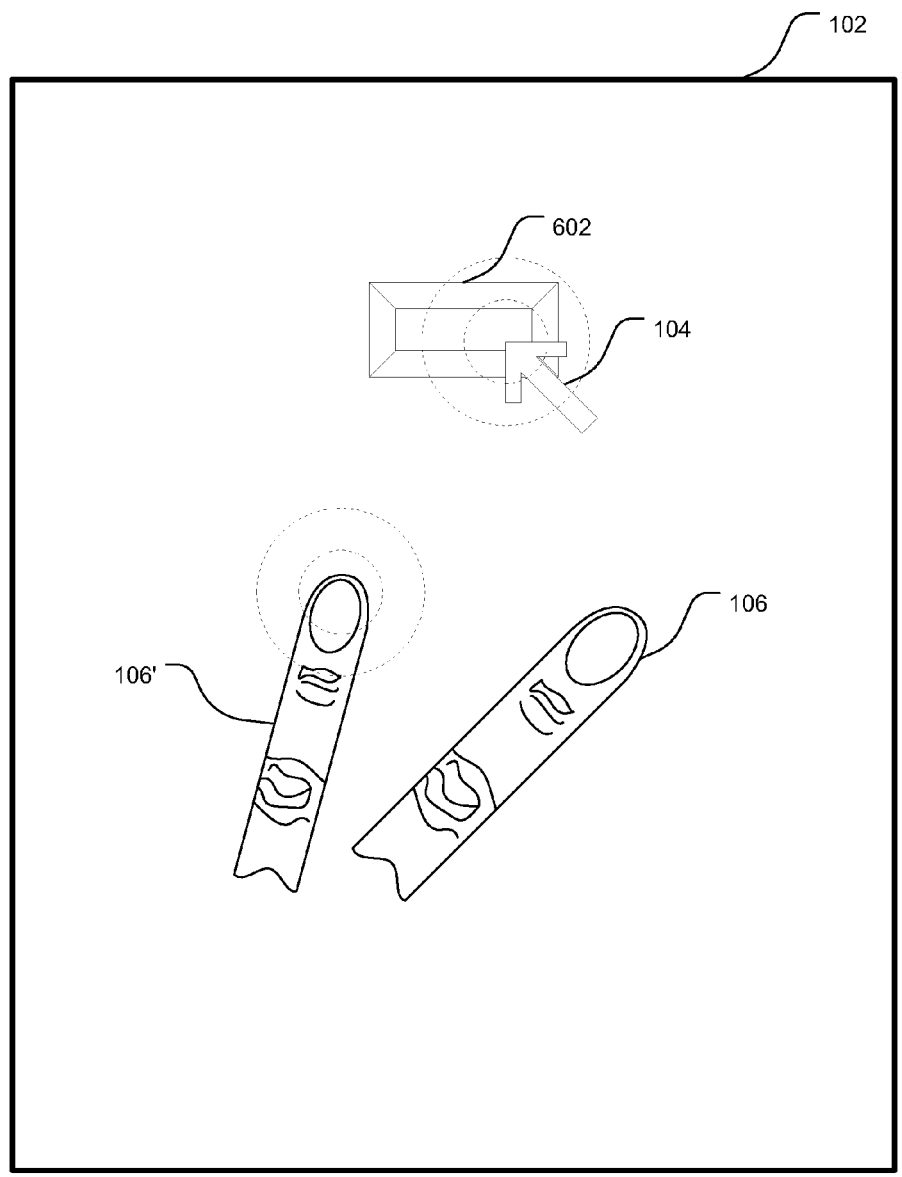
FIG. 6 is a GUI diagram depicting the use of a second body member to make a selection in combination with the cursor positioning techniques described above in, for example, FIGS. 4 and 5, according to an example embodiment.

FIG. 6 is a GUI diagram depicting the use of a second body member to make a selection in combination with the cursor positioning techniques described above in, for example, FIGS. 4 and 5, according to an example embodiment. As depicted, the touch-sensitive display screen 102 displays an object 602 and a cursor 104. Here, a user can use his finger 106 to move the cursor 104 from an offset, as described above. In addition, the user can use a different body member, such as a second finger 106', to make a selection. Here, the user can touch the touch-sensitive display screen 102 with his second finger 106' while the finger 106 remains in place. This second touch results in a selection being made at a position of the cursor 104 resulting in a selection of the GUI object 602. In particular, the second finger 106' can be detected to touch the touch-sensitive display screen 102 at the same time as the finger 106, thereby resulting in the selection of the object 602 as targeted by the cursor 104. In effect, a user can make a selection at a position indicated by the cursor 104 by tapping his second finger 106' on the touch-sensitive display screen 102.

Figure 7:
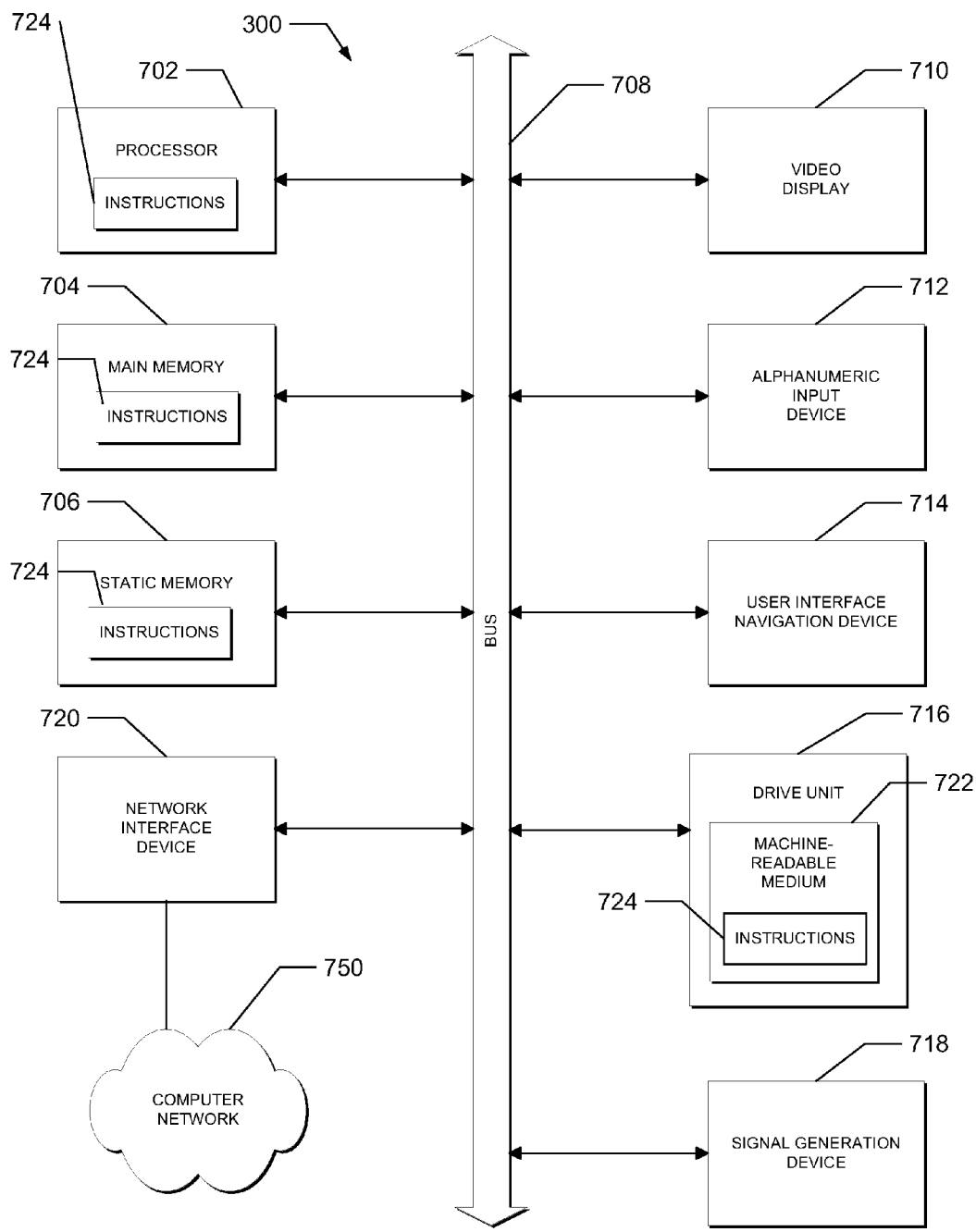
FIG. 7 depicts a block diagram of a machine in the example form of a processing system within which may be executed a set of instructions for causing the machine to perform any one or more of the methodologies discussed herein.

FIG. 7 depicts a block diagram of a machine in the example form of a computing device 300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 300 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The computing device 300 may further include video display unit 710 (e.g., a plasma display, a liquid crystal display (LCD) or a cathode ray tube (CRT)). The computing device 300 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by computing device 300, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 300) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for cursor positioning may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of positioning a cursor displayed on a touch-sensitive display screen configured to be touched by a body member, the method comprising:
   detecting the body member touching the touch-sensitive display screen;
   identifying an offset between the body member and the cursor;
   detecting movement of the body member relative to the touch-sensitive display screen;
   moving the cursor from the offset to match the movement of the body member;
   detecting the body member being released and repositioned to a different position on the touch-sensitive display screen;
   identifying a different offset between the body member at the different position and the cursor;
   detecting additional movement of the body member after the detection of the reposition; and
   moving the cursor from the different offset to match the additional movement of the body member.

2. The method of claim 1, wherein the cursor remains stationary when the body member is repositioned to the different position on the touch-sensitive display screen.

3. The method of claim 1, further comprising:
   detecting a different body member touching the touch-sensitive display screen; and
   selecting an object proximate to the cursor based on the detection of the different body member touching the touch-sensitive display screen.

4. The method of claim 1, further comprising:
   recording a position of the cursor based on the detection of the body member being picked up, and
   wherein the cursor is moved from the recorded position to match the additional movement.

5. The method of claim 1, wherein the identification of the offset comprises calculating a difference between a cursor position of the cursor and a body position of the body member on the touch-sensitive display screen.

6. The method of claim 1, wherein the detection of the body member touching the touch-sensitive display screen comprises receiving an event indicating the body member touching the touch-sensitive display screen.

7. The method of claim 1, wherein the detection of the movement comprises receiving an event indicating the movement of the body member.

8. The method of claim 1, wherein the detection of the body member being released comprises receiving an event indicating the release of the body member.

9. A non-transitory, machine-readable medium that stores instructions, which, when performed by a machine, cause the machine to perform operations comprising:
   identifying a first cursor position of a cursor displayed on a touch-sensitive display screen;
   detecting a body member touching the touch-sensitive display screen at a first body position on the touch-sensitive display screen;
   calculating a first offset between the first cursor position and the first body position;
   detecting the body member moving from the first body position to a second body position on the touch-sensitive display screen;
   moving the cursor from the first cursor position to a second cursor position on the touch-sensitive display screen, the movement of the cursor matching the movement of the body member to the second body position and the movement being made from the calculated first offset;

detecting an absence of the body member on the touch-sensitive display screen;

detecting the body member touching the touch-sensitive display screen at a third body position on the touch-sensitive display screen after the detection of the absence;

calculating a second offset between the second cursor position and the third body position on the touch-sensitive display screen;

detecting the body member moving from the third body position to a fourth body position on the touch-sensitive display screen; and moving the cursor from the second cursor position to a third cursor position on the touch-sensitive display screen, the movement of the cursor matching the movement of the body member to the fourth body position and the movement being made from the calculated second offset.

10. The non-transitory, machine-readable medium of claim 9, further comprising:

detecting a different body member touching the touch-sensitive display screen; and selecting an object proximate to the cursor based on the detection of the different body member touching the touch-sensitive display screen.

11. The non-transitory, machine-readable medium of claim 9, further comprising:

recording the second cursor position after the detection of the absence of the body member; and retrieving the second cursor position after detecting the body member touching the touch-sensitive display screen at the third body position, wherein the second offset is calculated based on the retrieved second cursor position.

12. The non-transitory, machine-readable medium of claim 9, wherein the first offset is calculated based on a difference between the first cursor position and the first body position.

13. The non-transitory, machine-readable medium of claim 9, wherein the second offset is calculated based on a difference between the second cursor position and the third body position.

14. A computing device comprising:

a touch-sensitive display screen;

a cursor generation module configured to detect a body member touching the touch-sensitive display screen;

a cursor offset module configured to identify an offset between the body member and a cursor;

the cursor generation module configured to detect movement of the body member relative to the touch-sensitive display screen;

the cursor generation module configured to move the cursor from the offset to match the movement of the body member;

the cursor generation module configured to detect the body member being released and repositioned to a different position on the touch-sensitive display screen;

the cursor offset module configured to identify a different offset between the body member at the different position and the cursor;

the cursor generation module configured to detect additional movement of the body member after the detection of the reposition; and the cursor generation module configured to move the cursor from the different offset to match the additional movement of the body member.

15. The computing device of claim 14, wherein the cursor remains stationary when the body member is repositioned to the different position on the touch-sensitive display screen.

16. The computing device claim 14, further comprising the cursor generation module configured to detect a different body member touching the touch-sensitive display screen and configured to select an object proximate to the cursor based on the detection of the different body member touching the touch-sensitive display screen.

17. The computing device of claim 14, further comprising the cursor generation module configured to record a position of the cursor based on the detection of the body member being picked up, wherein the cursor is moved from the recorded position to match the additional movement.

18. The computing device of claim 14, wherein the identification of the offset comprises calculating a difference between a cursor position of the cursor and a body position of the body member on the touch-sensitive display screen.

* * * * *